United States Patent
Abbaspour et al.

(10) Patent No.: US 8,108,815 B2
(45) Date of Patent: Jan. 31, 2012

(54) ORDER INDEPENDENT METHOD OF PERFORMING STATISTICAL N-WAY MAXIMUM/MINIMUM OPERATION FOR NON-GAUSSIAN AND NON-LINEAR DISTRIBUTIONS

(75) Inventors: Soroush Abbaspour, Hopewell Jct., NY (US); Peter Feldmann, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 12/471,653

(22) Filed: May 26, 2009

(65) Prior Publication Data

US 2010/0306723 A1    Dec. 2, 2010

(51) Int. Cl.
    *G06F 17/50*    (2006.01)
(52) U.S. Cl. .................... 716/108; 716/113; 703/16
(58) Field of Classification Search .............. 716/108, 716/113; 703/16
See application file for complete search history.

(56) References Cited

U.S. PATENT DOCUMENTS

| 5,239,481 | A  | * | 8/1993 | Brooks et al. ............... 716/113 |
| 7,293,249 | B2 |   | 6/2007 | Chang et al. |
| 7,428,716 | B2 |   | 9/2008 | Visweswariah |
| 2005/0065765 | A1 | | 3/2005 | Visweswariah |
| 2009/0013294 | A1 | | 1/2009 | Visweswariah |

OTHER PUBLICATIONS

D. Sinha, "Advances in Computation of the Maximum of a Set of Random Variables," Proceedings of the 7th International Symposium of Quality Electronics Design, 200, pp. 306-311, IEEE Jul. 2006.
C.E. Clark, "The Greatest of a Finite Set of Random Variables," Operation Research, vol. 9 No. 2, pp. 145-162, Mar.-Apr. 1961.
C. Visweswariah, "First-Order Incremental Block-Based Stastical Timing Analysis," in Proceeding of Design Automation Conference, 2004, pp. 331-336.
"Statistical Static Timing Analysis With Conditional Linear Maximum/Minimum Approximation and Extended Canonical Timing Model," [IEEE Transactions of Computer-Aided Design Integrated Circuits Systems, vol. 25, No. 6, pp. 1183-1191, Jun. 2006].
"Matrix Computations," 3rd Edition, Johns Hopkins Studies in Mathematical Sciences, 1996.

* cited by examiner

*Primary Examiner* — Phallaka Kik
(74) *Attorney, Agent, or Firm* — H. Daniel Schnurmann

(57) ABSTRACT

A method and system to improve the performance of an integrated circuit (IC) chip by removing timing violations detected by performing a statistical timing analysis, given distributions of process and environmental sources of variation. The distributions are quantized using a minimum distortion criterion into discrete values. For each timing node of the IC circuit, a discrete minimum and maximum operation is performed on the timing parameters using a subset of combinations of the discrete values. The results of the discrete minimum and maximum operation are then de-quantized and propagated to a subsequent timing node and edge thereof. The process continues until one or more primary inputs and outputs of the IC chip are reached. The design of the IC chip is modified by removing all the timing violations identified.

17 Claims, 5 Drawing Sheets

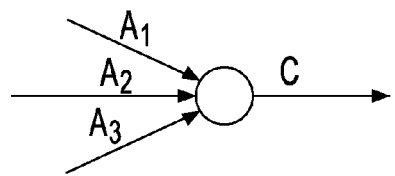
FIG. 2A
(PRIOR ART)
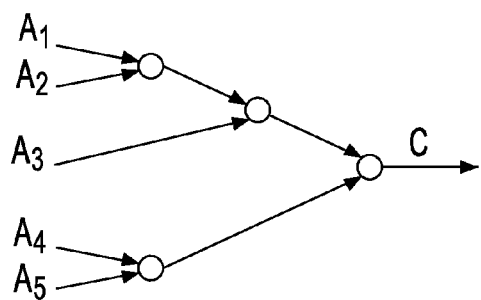
FIG. 2B
(PRIOR ART)
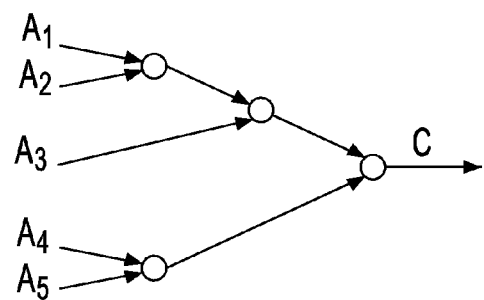
FIG. 2C
(PRIOR ART)
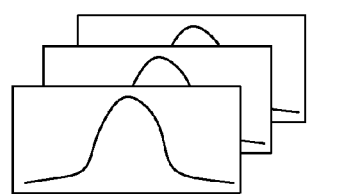
FIG. 3
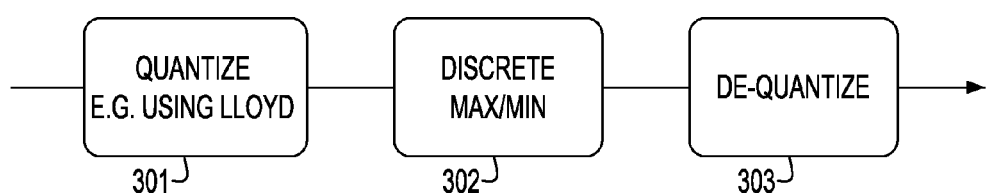

ORDER INDEPENDENT METHOD OF PERFORMING STATISTICAL N-WAY MAXIMUM/MINIMUM OPERATION FOR NON-GAUSSIAN AND NON-LINEAR DISTRIBUTIONS

BACKGROUND

This invention generally relates to design automation of Very Large Integrated Circuits (VLSI) chips, and more particularly to a Statistical Timing Analysis performing an efficient statistical N-way maximum/minimum operation for Gaussian, non-Gaussian, linear, and non-linear distributions.

RELATED ART

It is known in the art that the electrical characteristics of devices and their respective interconnects vary from one integrated circuit (IC) chip to another as a function of semiconductor manufacturing process variations, changing environments, job lots, variations in the fabrication steps, and the like. The above considerations are exacerbated as the chip circuit density increases, as groundrules become tighter, making variations larger and more numerous. In order to harness the problems caused by the stated variations, the effects on chip timing of the actual statistical manufacturing characteristics of process parameters variations are taken into account during the actual design of the circuits. This approach is known in industry as a Statistical Static Timing Analysis (SSTA).

The Statistical Static Timing Analysis represents an enhancement of a Static Timing Analysis (STA) which has been traditionally used to verify the timing correctness of VLSI chips. STA calculates the timing quantities, primarily switching times, starting from the primary input pins of the chip to determine the earliest and latest possible transition times at its primary output pins. As the Complementary Metal-Oxide Semiconductor (CMOS) process technologies scale down towards nanometer regimes, variability becomes a major concern for the design of VLSI circuits. Variability-aware design automation tools, such as SSTA are required in order to accurately predict the behavior of VLSI circuits.

Statistical static timing analysis (SSTA) tools can be classified in two categorizes: 1) block-based and 2) path-based. In the parameterized block based statistical static timing analysis, the timing quantities are stored and propagated in canonical forms which express timing quantities as a function of process and environmental sources of variations. The dependency of the timing quantities on sources of variation is thus represented with either linear or non-linear functions, while the sources of variation can be correlated or independent.

Two major operations for parameterized block-based statistical SSTA are statistical maximum and minimum operations. A statistical maximum (minimum) of two timing quantity distributions computes the best approximate distribution of the maximum (minimum). In this flavor of SSTA, all the distributions are represented in canonical form. Statistical maximum (minimum) for two canonical timing quantities are known and widely used in the art. However, for the case of an N-way (where N>2), the statistical maximum (minimum) is based on applying successive 2-way maximum (minimum). As such, the result of successive 2-way methods are dependent on the order of pairings, and the accuracy of N-way maximum (minimum) is dependent on the order of pair-wise statistical maximum (minimum) operations.

Referring to FIG. 1(a), a circuit is illustrated consisting of gates, 100, 101, 102, and interconnects 103 and 104, connecting the gates together. To perform a timing analysis on this circuit, voltage signals 105 at primary input pins 106 of the circuit chip are propagated through gates and interconnects until they reach the primary output pins 107 of the chip.

Initially, the STA tool creates a timing graph representation of the circuit, assigning an arrival time for every signal at the primary inputs of the circuit, and propagating the signals from the primary inputs of the circuit to its primary outputs. FIG. 1(b) shows a timing graph representation corresponding to the circuit shown in FIG. 1(a). The nodes in graph 108 and 109 represent the gates, and the edges 110 and 111 represent the circuit interconnects. The directed edges represent the direction of the voltage signal propagation. The nodes' fan-in is equal to the number of incoming edges into the node, and the nodes' fan-out is equal to the number of outgoing edges of the node. For instance, node 108 has a fan-in of 1 and a fan-out of 1, whereas node 109 has a fan-in of 3 and a fan-out 1. During STA, numerical weights are usually assigned to every edge and every node. The edge weight typically represents the interconnect propagation delay and the node weight represents the gate propagation delay.

To perform a timing analysis, STA computes and propagates timing quantities, such as voltage signals' arrival timing, required arrival time, slew, and slack at every point of the timing graph. In order to compute the above-mentioned timing quantities, addition, subtraction, minimum and maximum operations are employed. For example, for a gate having more than one input, the arrival time at the output pin represents the maximum or minimum of the signal arrival times at each input plus the propagation delay within the gate itself. In the case of the static timing analysis, the timing quantity at the output of a node is simply obtained by computing the maximum or minimum of scalar values. Therefore, the result is unique.

In contrast, SSTA performs the same operations on distributions represented by canonical forms. The minimum or maximum operations between canonical forms can only be performed approximately and, therefore, when an N-way maximum (minimum) is computed by successive applications of the 2-way maximum (minimum), the final approximation will depend on the order of the operations.

The method introduced by one embodiment of the invention relies on approximating the continuous distributions of the timing quantities by discrete distributions. This process called quantization is widely employed in other fields, e.g., signal processing, for which well established methods exist, e.g., Lloyd's method.

SUMMARY

These and other disadvantages of the prior art are addressed by an embodiment of the invention, which is directed to a method and a system for performing a Statistical Static Timing Analysis (SSTA) capable of handling Gaussian and non-Gaussian, linear and non-linear sources of variations.

In one aspect of the present invention, an efficient order-independent statistical maximum (minimum) calculation of N timing quantities expressed in canonical form is performed. Sources of variation may be correlated or uncorrelated, Gaussian or non-Gaussian, and the dependency of the timing quantities to the sources of variations may be expressed as a linear or non-linear function.

In another aspect of the invention, quantization and de-quantization based techniques make it possible to perform an N-way statistical maximum (minimum) operation. Sources of variations are quantized with minimum distortion using quantization techniques. A static maximum (minimum) operation on the quantized values is then performed. When carried on to full accuracy, the operation cost increases exponentially in the number of sources of variation and, therefore, it may become prohibitive.

In still another aspect of the invention, an approximate way of computing the minimum maximum of distributions expressed in canonical form with discretized sources of random variations is introduced. The cost of computing this approximation to the minimum maximum operation is linear with respect to the number of quantization values.

In yet another aspect of the invention, a de-quantization operation is performed on the results which return the output distribution to canonical form expressed in continuous variables, permitting the timing analysis to process every edge and node of the timing graph.

In a further aspect of the invention, a method and a system of improving the performance of circuits forming an integrated circuit (IC) chip are provided by removing timing violations detected upon performing a statistical timing analysis given distributions of process and environmental sources of variation, the method including:
 a) quantizing the distributions using a minimum distortion criterion into discrete values;
 b) for each timing node of the IC circuit, executing by way of a computer a discrete minimum and maximum operation on timing parameters using a subset of combinations of the discrete values;
 c) de-quantizing results of the discrete minimum and maximum operation;
 d) propagating the de-quantized results to a subsequent timing node thereof until primary inputs and outputs of the IC chip are reached.

BRIEF DESCRIPTION OF DRAWINGS

The accompanying drawings, which are incorporated in and which constitute part of the specification, illustrate preferred embodiments of the invention which, together with the general description given above and the detailed description of the preferred embodiments given below, serve to explain the principles of the invention.

FIG. 2 shows a prior art ordered pair-wise statistical technique used to perform statistical N-way maximum/minimum analysis of N canonical timing quantities.

FIG. 3 is a block diagram depicting a method for performing order-independent N-way maximum/minimum operation on N timing quantities described in canonical form, according to an embodiment of the present invention.

DETAILED DESCRIPTION

Figure 1A:
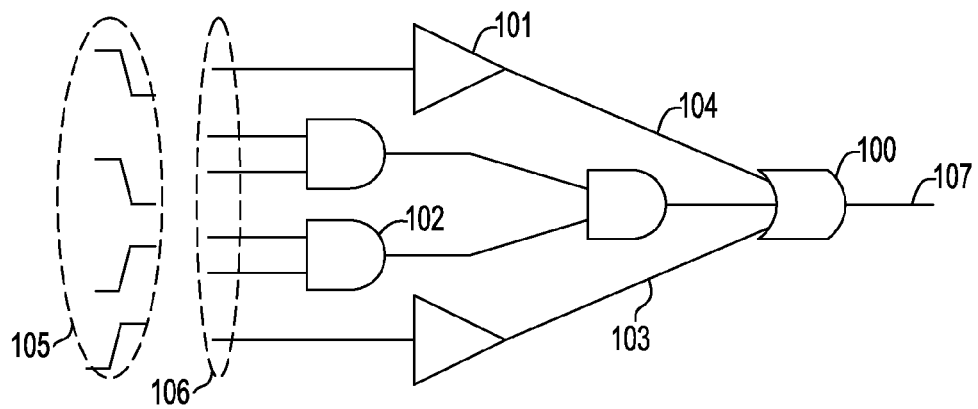
FIG. 1, shows an illustrative prior art circuit and a corresponding graph representation of its timing behavior.
Figure 1B:
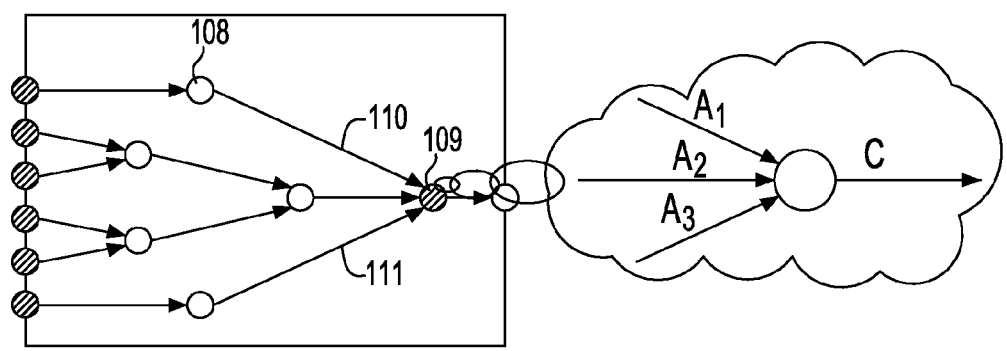

The present invention uses a generalized version of a linear canonical form for representing gate delays. Described hereinafter is a preferred embodiment of the present invention that approximates all arrival times in the same generalized canonical form, matching the exact mean and standard deviation in a manner completely similar to the original statistical STA. Accordingly, the present invention is very convenient for implementation in a statistical timing analyzer.

An embodiment of the invention adds several functions which compute, when required by the SSTA, the N-way maximum and minimum operations between generalized canonical forms according to the algorithm described in an embodiment of the invention. There is no other modification of the algorithmic flow of the SSTA process. Thus, the present invention can be implemented without affecting the majority of the existing code. The benefit of the proposed invention is a substantial increase in the accuracy of the SSTA, A description will now be given regarding a first-order approximation of the maximum of arrival times depending on a Gaussian distribution.

In one embodiment, the present invention is directed to a general, statistical maximum/minimum technique that calculates the maximum/minimum of N timing quantity in canonical form as a function of a set of global and random sources of variation in a new canonical quantity. These quantities include linear or non-linear functions of environmental and manufacturing process sources of variation including power and ground voltage variations, where the sources of variation can be Gaussian, non-Gaussian, symmetric or non-symmetric. The dependency of the timing quantities to the sources of variation can be represented by linear or non-linear functions while the sources of variation can be correlated or independent.

In a real circuit scenario, signal arrival times and transition times in the design depend on a variety of different factors, including technology, environment, and manufacturing process parameters. Due to the statistical nature of the technology, environment and manufacturing process parameters, modeling with random variables with determined probability distributions may be used. In a parameterized SSTA, the computed timing quantities (e.g., arrival times, delays, slews, slacks, and the like) are represented for, illustrative purposes, in first order canonical form as shown in EQ 1:

$$A_k = A_{k,o} + \sum_{j=1}^{N} q_{k,j} x_j + c_k r_k \qquad \text{EQ 1}$$

where
$A_k$ is the timing quantity in the canonical format;
$A_{k,0}$ is the nominal value of the timing quantity in canonical form;
$x_{k,j}$ is the variation of $j^{th}$ source of variation from its nominal value;
$q_j$ is the sensitivity of the timing quantity $A_k$ to the source of variation $x_j$;
$r_k$ is the uncorrelated variation in quantity $A_k$, and $c_k$ is the sensitivity of the timing quantity $A_k$ to the uncorrelated variation $r_k$.

Sources of variation $x_j$ and $r_k$ may include Gaussian, non-Gaussian, symmetric or non-symmetric distributions.

In one embodiment, the first order canonical form, such as in EQ 1, Gaussian sources of variation are employed to describe the invention. In another embodiment, the invention is extended to non-Gaussian sources of variation as well as a non-linear dependence of the timing quantities to the sources of variation.

In the case of statistical STA (SSTA), the timing quantities at the N fan-in ports of a timing node are given in canonical form, as shown in EQ 1. Therefore, to determine the timing quantity at the output of the timing node, the maximum/minimum of N canonical forms needs to be computed and represented in canonical form.

According to the present state of the art the maximum/minimum is computed by successive pair-wise maximum/minimum operations each using an approximate algorithm based on a method such as the one described by C. E. Clark, "The greatest of a finite set of random variables," Operation Research, vol. 9, no. 2, pp. 145-162, March-April 1961. Pair-wise operations need to be performed in a predetermined order. There is no known efficient way to choose the order in a way to minimize the accumulation of errors. It is worth noting that the order of pair wise operations can significantly affect the accuracy and consistency of the computed timing quantities at the output of the timing nodes, thereby, contributing to the inaccuracy of the SSTA performed on the circuit.

Referring now to FIG. 2(a), showing an illustrative example of a 5-way maximum/minimum operation for five timing quantities $A_1, A_2, \ldots$ and $A_5$, the results of which are represented in a new canonical form C. Using for illustrative purposes the previously stated pair-wise maximum/minimum technique, there are many ways to perform the N-way max/min, two of which are illustrated in FIGS. 2(b) and 2(c). Depending on the distribution of $A_1, \ldots, A_5$, the results of FIG. 2(b) and FIG. 2(c) may differ from one another, and are, further, also different from the actual maximum/minimum of the 5-way max/min between them.

Referring now to FIG. 3, a unique, consistently defined, order independent way to compute the maximum or minimum operation of N distributions of timing quantities expressed in canonical form, and producing the results, likewise in canonical form, according to one embodiment of the invention, will now be described.

FIG. 3 illustrates three steps necessary for the order-independent N-way maximum/minimum computation:
a) quantizing the continuous distribution of the sources of variation 301, e.g., by Lloyd's method, producing a minimum distortion discrete distribution;
b) performing static maximum/minimum operation on the quantized discrete distributions 302; and
c) de-quantizing the resulting distribution of the maximum/minimum previously obtained, and restating the result in canonical form 303.

Since the static maximum/minimum operation in step ii) operates simultaneously on all N discrete distributions, it does not depend on any ordering of the inputs. Therefore, the result is consistent, unique and order independent. On the other hand, the operation is performed on quantized, and therefore approximated, distributions of the sources of variation. Thus, in order to ensure accurate results of the maximum/minimum operation, the quantization needs to generate a minimal distortion. An efficient quantization algorithm such as Lloyd's algorithm, known in the art, can be utilized to ensure the minimum distortion criteria. Another approach to reducing the distortion is by increasing the number of quantization levels of the continuous distribution. However, an unnecessarily high degree of quantization will adversely affect the efficiency of static maximum/minimum operation and of the de-quantization step that follows.

A numerical example will now be described to further illustrate the previously mentioned three steps of an embodiment of the present invention.

Assuming two arrival time distributions given in canonical form as a function of two normalized independent Gaussian sources of variation $X_1$ and $X_2$ ($X_1$ and $X_2$ having a mean of 0 and standard deviation of 1), as follows:

$$A_1=2.0+0.5X_1+1.5X_2 \quad A_2=2.5+1.5X_1+0.5X_2 \qquad \text{EQ. 2}$$

The objective is to determine the distribution of the maximum C of A1 and A2 in first order canonical form as follows:

$$C=c_0+c_1X_1+c_2X_2 \qquad \text{EQ. 3}$$

In other words, $c_0$, $c_1$, and $c_2$ need to be computed such that they approximate the distribution of C=max $(A_1, A_2)$.

Figure 4:
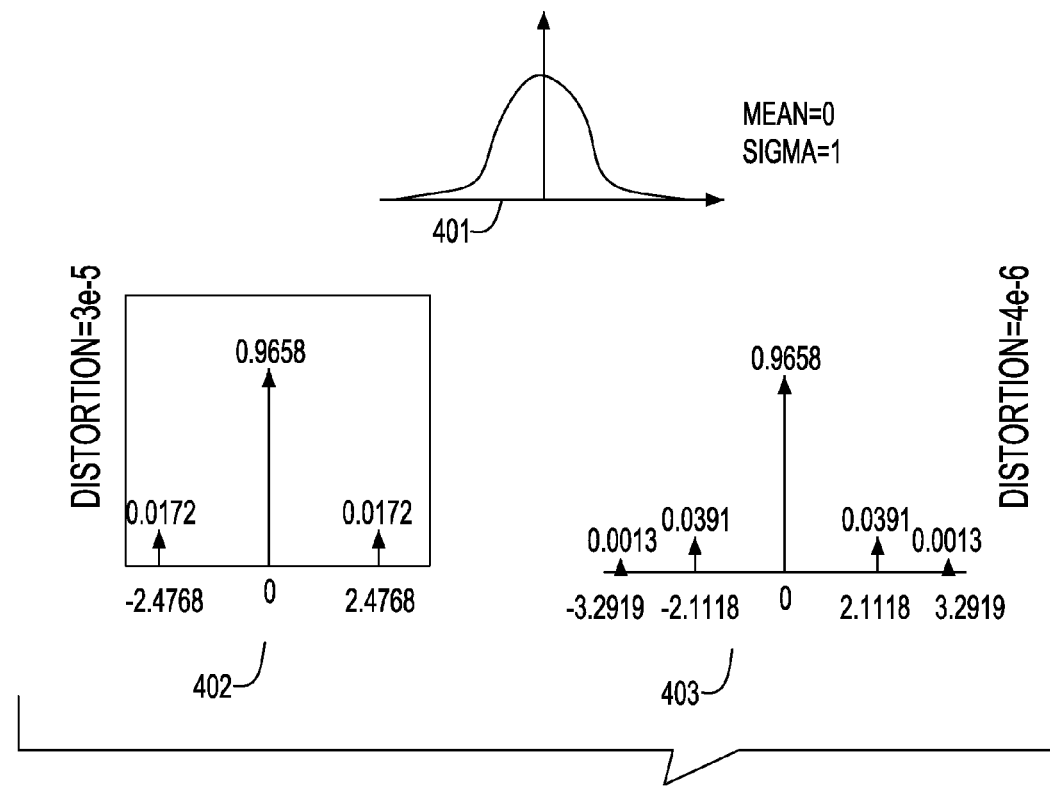
FIG. 4 illustrated a normalized Gaussian distribution showing the quantization step of the invention on global sources of variation, assuming that $X_1$ and $X_2$ have similar distributions.

FIG. 4 shows the quantization step of an embodiment of the present invention on global sources of variation (assuming that both $X_1$ and $X_2$ have a similar distribution). For the present example, the aforementioned Lloyd's technique is advantageously employed to quantize the continuous normalized Gaussian distribution 401 (having a mean=0 and a standard deviation=1) into three levels 402, and five levels 403. In the case of three-level quantization by Lloyd's method, the quantized distribution have three levels (−2.4768, 0, 2.4768) with corresponding weights of (0.0172, 0.9658, 0.0172). The least square distortion for the quantization is equal to 3e-5. In the case of the five-level quantization, Lloyd generates the quantized distribution with five levels (−3.2919, −2.1118, 0, 2.1118, 3.2919) with corresponding weights of (0.0013, 0.0391, 0.9193, 0.0391, 0.0013) having a least square distortion of 4e-6. As described in the present example, adding more quantization levels decreases the distortion. However, as described above, it can have a significant impact on the efficiency of the next two steps of the invention.

In the next step, the quantized distributions are used and the static maximum/minimum operation is applied to them. For brevity, assume $X_1$ and $X_2$ being quantized in three levels, $$X_1 \sim \{(x_{1,1},w_{1,1}),(x_{1,2},w_{1,2}),(x_{1,3},w_{1,3})\}=\{(-2.4768, 0.0172),(0,0.9658),(2.4768,0.0172)\}$$

and $$X_2 \sim \{(x_{2,1},w_{2,1}),(x_{2,2},w_{2,2}),(x_{2,3},w_{2,3})\}=\{(-2.4768, 0.0172),(0,0.9658),(2.4768,0.0172)\}$$

Figure 5:
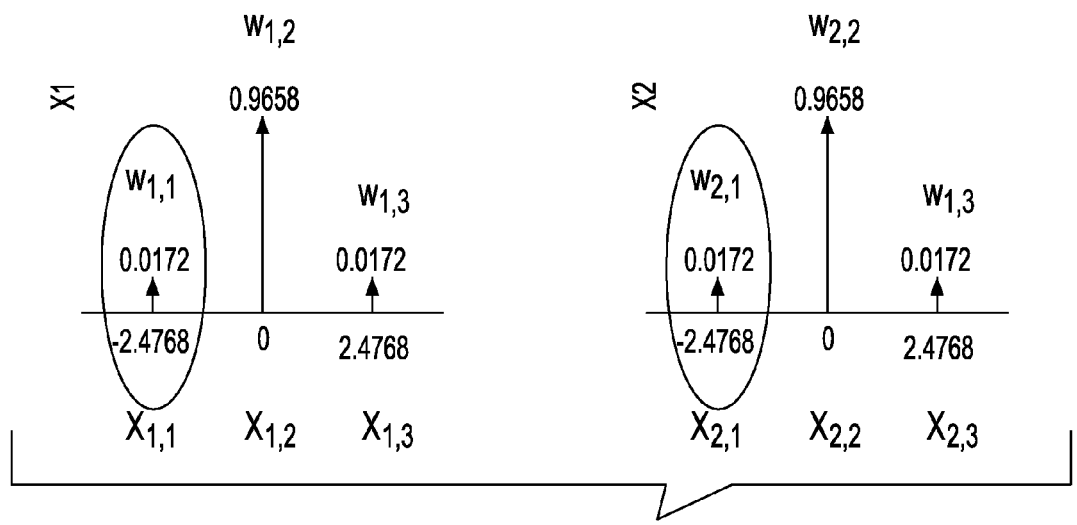
FIG. 5 illustrates the process of 2-way max operation of two canonical timing quantities with quantized underlying global sources of variation and applying a static maximum/minimum operation on them and which assumes $X_1$ and $X_2$ quantized in three levels, according to an embodiment of the invention.

In order to perform the static maximum operation, the most accurate approach is to consider all nine combinations of $X_1$ and $X_2$ quantized points. It is assumed that by selecting $(x_{1,i}, x_{2,j})$ one can gain information equal to $w_{1,i}*w_{2,j}$. Therefore, as shown in FIG. 5, $(x_{1,1}, x_{2,1})$ adds 0.0172*0.0172=3e-4 information out of 1.

Table II that follows shows the amount of information that each combination of $(x_{1,i}, x_{2,j})$ adds to the maximum/minimum operation:

TABLE I

| Combination | X1 | X2 | W1, 2 |
|---|---|---|---|
| 1 | −2.4768 | −2.4768 | 0.0172 * 0.0172 = 3e−4 |
| 2 | 0 | −2.4768 | 0.9658 * 0.0172 = 0.0166 |
| 3 | 2.4768 | −2.4768 | 0.0172 * 0.0172 = 3e−4 |
| 4 | −2.4768 | 0 | 0.0172 * 0.9658 = 0.0166 |
| 5 | 0 | 0 | 0.9658 * 0.9658 = 0.9328 |

TABLE I-continued

| Combination | X1 | X2 | W1, 2 |
|---|---|---|---|
| 6 | 2.4768 | 0 | 0.0172 * 0.9658 = 0.0166 |
| 7 | −2.4768 | 2.4768 | 0.0172 * 0.0172 = 3e−4 |
| 8 | 0 | 2.4768 | 0.9658 * 0.0172 = 0.0166 |
| 9 | 2.4768 | 2.4768 | 0.0172 * 0.0172 = 3e−4 |

Referring to the above Table I, out of the nine combinations of quantized $X_1$ and $X_2$, only five (i.e., combinations 2, 4, 5, 6, 8) are shown to provide significant information. If other combinations (i.e., 1, 3, 7, 9) are ignored, most of the information is captured during the static max operation. In other words, performing the static max operation on the other four combinations does not add too much information to the de-quantization step. For instance, if one were to neglect (−2.4768, −2.4768), then 0.0172*0.0172=0.03% of all the possible cases would be lost. Therefore, the aforementioned approach covers 0.9658(0.9658+4*0.0172)=99.9% of all possible cases.

In general, a full computation of the discretized distribution of the N-way max with q quantization points will require analyzing $q^N$ cases, thus making the process prohibitively expensive. The example above, however, indicates that an exhaustive analysis of all the cases is not required and the selection of a significantly smaller subset of cases yields acceptable accurate result. Such a subset selection includes:
a) Quantizing distributions with 3 points,
b) Selecting a case containing the central point for all distribution: 1 point, and
c) Selecting cases containing central points for all but one distribution and either the extreme low or the extreme high of the remaining one: 2N points.

Evidently, the set contains 2N+1 points for analysis and the cost of the minimum maximum computation increases linearly with the number of input distributions.

Figure 6:
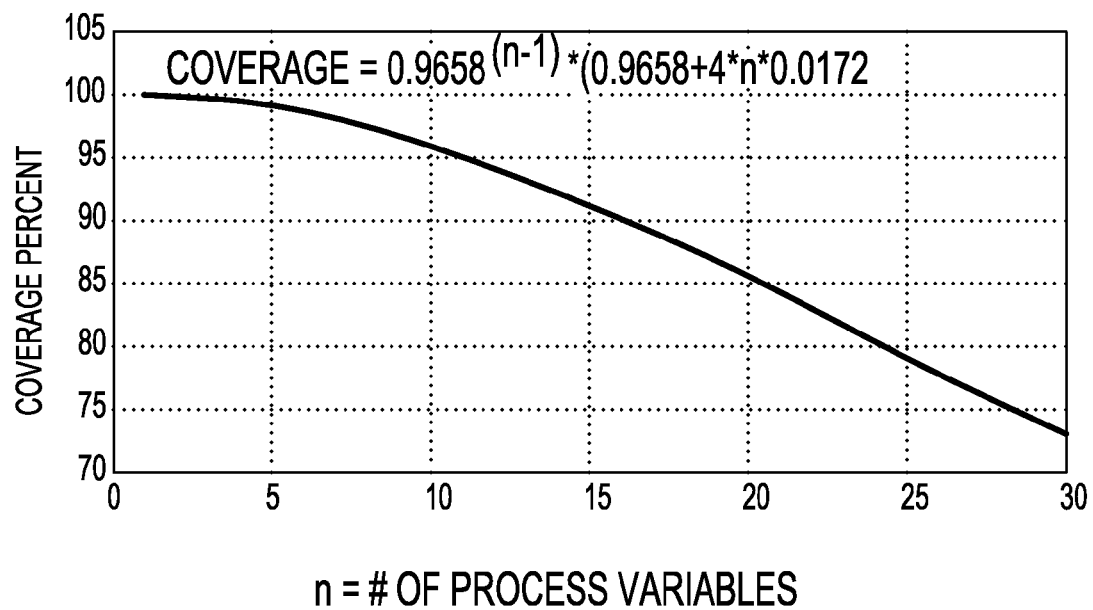
FIG. 6 shows the percentage coverage for a selected subset as a function of a number of sources of variation: quantizing distributions with three points, choosing the central point for all the distributions, and selecting the central points for all but one.

FIG. 6 illustrates the loss of accuracy due to the subset choice above compared to processing all the points as a function of the number of sources of variation n. The subset selection strategy covers $0.9658^{N-1}$ (0.9658+4n*0.0172) % of the information for the n sources of variation, while the complexity of static max operation is (2N+1) compared $3^N$ relative to the fully accurate max/min operation. Even with 15 sources of variation, the above approach will cover about 90% of the information, while the complexity of the static max operation is 6 orders of magnitude faster relative to choosing all possible combinations. Additional combinations can be chosen to improve the coverage, while still maintaining the efficiency of the static max operation.

The numbers above assume that the continuous distribution is quantized by 3 levels. In the general case, the p-level quantization extends to n sources of variation and the complexity of the fully accurate scheme is $p^N$. Using a similar subset selection scheme, a subset of size (p−1)N+1 still returns reasonably accurate results.

The second step of the embodiment of the invention uses selected combinations of the quantized sources of variation and evaluates the timing quantities in canonical forms for those combinations. The result is a canonical form expressed in terms of discrete random variables. For instance, for the above example, EQ. 4 shows the value of maximum of $A_1$ and $A_2$ for the selected combinations $X_1=0, X_2=0 \Rightarrow A_1=2, A_2=2.5 \Rightarrow \text{Max}=2.5$ $X_1=2.4768, X_2=0 \Rightarrow A_1=3.24, A_2=6.22 \Rightarrow \text{Max}=6.22$ $X_1=0, X_2=2.4768 \Rightarrow A_1=5.72, A_2=3.74 \Rightarrow \text{Max}=5.72$ $X_1=-2.4768, X_2=0 \Rightarrow A_1=0.02, A_2=-1.22 \Rightarrow \text{Max}=0.02$ $X_1=0, X_2=-2.4768 \Rightarrow A_1=-1.72, A_2=1.26 \Rightarrow \text{Max}=1.26$ \hfill EQ. 3

The last step of the operation is the de-quantization step. During de-quantization, the output of the static max operation is used to compute the parameters of C in EQ. 3. The Last Square (LS) method or Weighted Least Square method can be utilized to calculate the coefficients of C. Computing these coefficients requires to solve over-determined, rectangular systems of the type shown in the following EQ. 4:

$$\underbrace{\begin{bmatrix} 1 & 0 & 0 \\ 1 & 2.4768 & 0 \\ 1 & 0 & 2.4768 \\ 1 & -2.4768 & 0 \\ 1 & 0 & -2.4768 \end{bmatrix}}_{A} \begin{bmatrix} c_0 \\ c_1 \\ c_2 \end{bmatrix} = \underbrace{\begin{bmatrix} 2.5 \\ 6.22 \\ 5.72 \\ 0.02 \\ 1.26 \end{bmatrix}}_{b}$$

where
A is the matrix of the quantization combinations associated with the choice of point subset
b is the vector of probabilities associated with each point combination
$c=[c_0,c_1,c_2]$ is the coefficient vector such that
$C=\max(A_1,A_2)=c_0+c_1X_1+c_2X_2$ The system could be solved using standard linear algebra techniques such as the orthogonal-triangular QR factorization, as described in the textbook by G. H. Golub & C. F. van Loan, "Matrix Computations", 3$^{rd}$ Edition, John Hopkins Studies in Mathematical Sciences, 1996, as follows:

Ac=b

A=QR where

Q orthogonal: $Q^TQ=U$
R upper-triangular

Rc=$Q^T$b $c=R^{-1}Q^Tb=A^+b$ \hfill EQ5 where
Q is the orthogonal component of the QR factorization and $Q^T$ it's transpose
R is the triangular part of the above factorization
U is the appropriately sized unit matrix unit matrix
$A^+$ is also called the pseudo-inverse of A Assuming that the distribution of the process variation is given, the matrix
A is fixed. Therefore, only the right hand side, i.e., the b matrix, changes with each N-way max computation. Thus, the factorization and even the full pseudo-inverse matrix A+ can be pre-computed and stored before performing SSAT, thus making the de-quantization process even more efficient.

The following example shows how the accuracy of a three-way max operation performed using the above algorithm compared to the aforementioned Clark-based pair-wise max operation. Using a costly Monte-Carlo based max operation as the golden standard, and assuming that $A_1$, $A_2$, and $A_3$ are three arrival times given in canonical forms as a function of three normalized Gaussian sources of variation $X_1$, $X_2$ and $X_3$ and three independently random normalized Gaussian sources of variations $R_1$, $R_2$ and $R_3$. then $$A_1=47.84+8.33X_1+0.63X_2+1.44X_3+5.95R_1$$

$$A_2=51.64+0.87X_1+0.93X_2+3.63X_3+0.68R_2$$

$$A_3=55.33+0.30X_1+0.48X_2+4.16X_3+0.84R_3$$

The application of our algorithm produces the following expression for the 3-way max $$C=\text{Max}(A_1,A_2,A_3)=56.73+2.79\ X_1+0.48X_2+4.16X_3+ 1.46\ R_1+0.00\ R_2+0.84\ R_3 \quad \text{EQ 7}$$

| Algorithm | Mean | Variance |
| --- | --- | --- |
| Monte Carlo | 56.75 | 5.1179 |
| Clark-based pair-wise max method | 56.70 | 4.5156 |
| Inventive method | 56.73 | 5.3063 |

Clearly, the results achieved by the present invention show that the mean and variance of the distribution of the max are closer to the Monte-Carlo prediction than the pair-wise method. Moreover, the pair-wise method predicts a different distribution if the operations were paired differently.

Figures 7A, 7B:
FIG. 7 shows a sample quantization of non-symmetric sources of variation, wherein de-quantization results in non-symmetric quantized points having non-symmetric weights.

FIG. 7 shows an embodiment of the invention being extended to support non-symmetric sources of variation. In the case of non-symmetric sources of variation, the de-quantization technique, such as Lloyd's method, results in non-symmetric quantized points with non-symmetric weights. However, the remainder of the algorithm can be applied, as described earlier.

Figure 8:
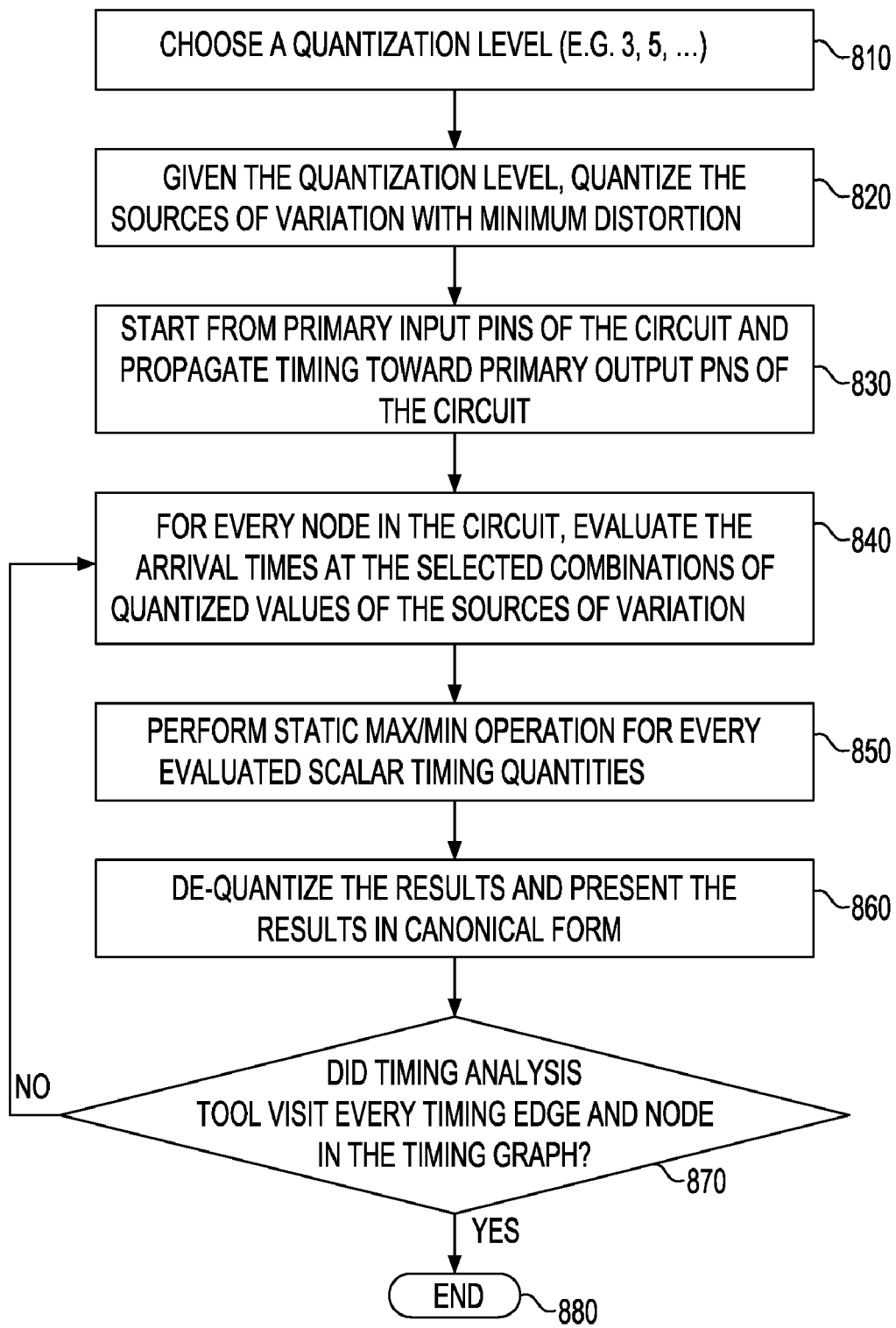
FIG. 8 is a flow diagram illustrating the improved statistical STA flow, according to an embodiment of the invention.

FIG. 8 summarizes the entire algorithmic flow of one embodiment the present invention.

In step 810, a statistical STA obtains the number of quantization levels of sources of variation as an input from the user. Depending on the required level of accuracy and efficiency, a designer chooses the number of levels of quantization, e.g. 3, 5 . . . . Different quantization levels can be selected for performing SSTA at different stages of the design flow, e.g., starting with smaller quantization levels but choosing larger ones as the design proceeds from earlier stages toward the sign-off stage.

In step 820, SSTA performs the quantization of the random variable distributions of the sources of variation by, e.g., Lloyd method, into the previously user-defined number of levels. For instance, FIG. 4 shows the result of three and five level quantization on a normalized Gaussian distribution.

In step 830, the statistical SSTA starts by propagating the timing quantities from the circuit primary inputs toward the circuit primary outputs using the asserted voltage waveforms at the primary input of the circuit.

In step 840, while performing SSTA, once the distribution of the arrival times for every fan-in edge of a timing node is calculated, SSTA needs to compute the maximum/minimum of the fan-in canonical arrival times, representing the obtained distribution in canonical form. SSTA selects the minimum subset of combinations of quantized values of sources of variation which covers the maximum amount of information given predetermined efficiency constraints. Next, SSTA evaluates the fan-in timing quantities at the selected combinations of the quantized sources of variation.

In step 850, SSTA performs the maximum/minimum operation on the evaluated scalar timing quantities determined in step 840. Finally, SSTA de-quantizes the maximum/minimum fan-in timing quantities in canonical forms using techniques such as the least square fitting (Step 860).

In step 870, SSTA determines if every timing node and edge in the timing graph was visited. If not, it branches back to step 840. If yes, the statistical timing analysis is complete (Step 880).

Through the use of the described N-way maximum procedure, the distributions of arrival times and other statistical quantities were computed with increased accuracy and in a consistent repeatable manner. In contrast, the traditional pair-wise maximum computation method accumulates errors much faster, resulting in more uncertainty in the computed distributions. As a result of the enhanced accuracy of the proposed algorithm, designers can produce more complex designs that utilize fewer resources, such as chip area and/or power.

The present invention can be realized in hardware, software, or a combination of hardware and software. The present invention can be realized in a centralized fashion in one computer system or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out the methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

While the present invention has been particularly described in conjunction of a simple illustrative embodiment, it is to be understood that one of ordinary skill in the art can extend and apply the invention in many obvious ways. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of improving a performance of circuits forming an integrated circuit (IC) chip when performing a statistical timing analysis given distributions of process and environmental sources of variation, wherein resulting statistical values achieve increased accuracy in a consistent repeatable manner, the method comprising:

a) using a computer, quantizing said distributions using a minimum distortion criterion into discrete values;

b) for each timing node of the IC chip, executing a discrete minimum and maximum operation on timing parameters using a subset of combinations of said discrete values;

c) de-quantizing results of said discrete minimum and maximum operation; and d) propagating said de-quantized results to subsequent timing nodes thereof until one or more primary inputs and outputs of said IC chip are reached.

2. The method as recited in claim 1, wherein the sources of variation comprise Gaussian and non-Gaussian distributions.

3. The method as recited in claim 1, wherein the timing parameters are a linear or nonlinear function of said sources of variation.

4. The method as recited in claim 1, wherein the timing parameters comprise delay, slew, voltage waveform, slack, arrival time and required arrival time.

5. The method as recited in claim 1 wherein quantizing said distributions is performed on continuous distributions resulting in a minimum distortion.

6. The method as recited in claim 1, wherein said discrete minimum and maximum operation on timing parameters further comprises evaluating timing quantities at the quantized sources of variation.

7. The method as recited in claim 1, wherein the discrete maximum and minimum operation is performed on i) all combinations of discrete values, and ii) on selected combinations of the discrete values.

8. The method as recited in claim 1 wherein a failure of said propagating de-quantized results to subsequent timing nodes is indicative of a failing timing node.

9. The method as recited in claim 8 further comprising modifying said integrated IC chip by removing all of said identified failing timing nodes.

10. The method as recited in claim 1 further comprising executing by said computer said de-quantization on results that return an output distribution in canonical form expressed in a continuous distribution.

11. The method as recited in claim 10 wherein said de-quantization enables a statistical timing analysis (SSTA) to process every edge and node of a timing graph representation of the IC chip.

12. The method as recited in claim 1 wherein a statistical timing analysis performs said quantization of distributions of said sources of variation into a predefined number of levels.

13. The method as recited in claim 12, wherein said statistical timing analysis propagates timing quantities from said IC chip primary inputs toward said primary outputs using asserted voltage waveforms at said primary inputs.

14. The method as recited in claim 13, wherein once a distribution of arrival times for every fan-in edge of a timing node is determined, said statistical timing analysis identifies a maximum and minimum of fan-in canonical arrival times, and represents said distribution in canonical form.

15. The method as recited in claim 14, wherein said statistical timing analysis selects a minimum subset of combinations of said quantized values of sources of variation covering a maximum amount of information.

16. The method as recited in claim 15, wherein said timing analysis evaluates fan-in timing quantities at selected combinations of said quantized sources of variation.

17. A program storage device readable by a machine, tangibly embodying a program of instructions executable by the machine to perform method steps of improving a performance of integrated circuits (ICs) in a VLSI chip when performing a statistical timing analysis given distributions of process and environmental sources of variation, wherein statistical quantities are computed with increased accuracy and in a consistent repeatable manner, the method comprising:

a) using a computer, quantizing said distributions using a minimum distortion criterion into discrete values;

b) for each timing node of the IC, executing a discrete minimum and maximum operation on timing parameters using a subset of combinations of said discrete values;

c) de-quantizing results of said discrete minimum and maximum operation;

d) propagating the de-quantized results to a subsequent timing node thereof until one or more primary inputs and outputs of the IC are reached; and e) modifying the IC by removing failing propagated de-quantized results to subsequent timing nodes.

* * * * *